(No Model.)
H. SCHAUBEL.
BOILER STAY.
No. 405,227. Patented June 11, 1889.
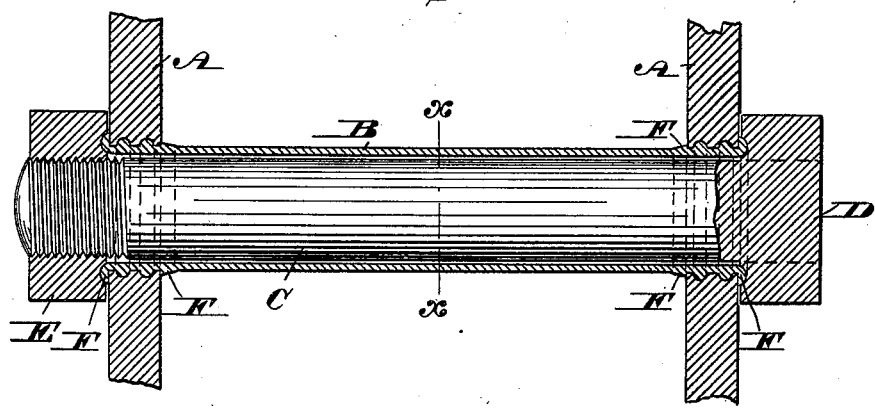
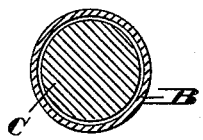
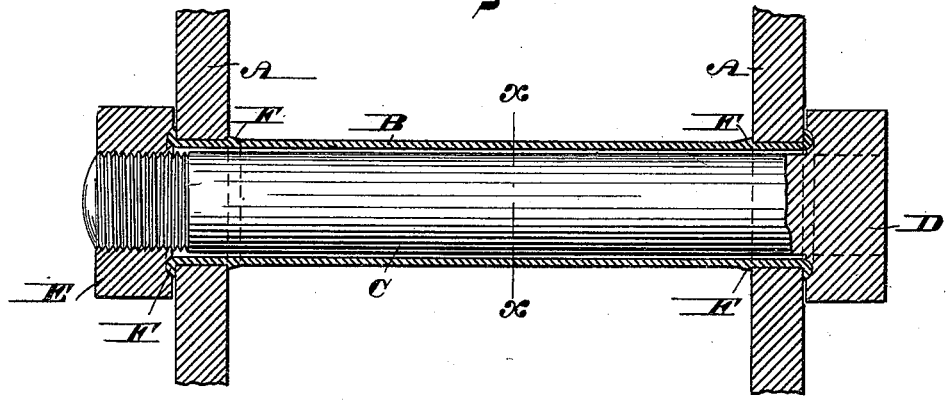
Witnesses
Theo. Rollé
A. P. Jennings
Inventor
Henry Schaubel.
By his Attorneys
Diederhsheim & Kintner

UNITED STATES PATENT OFFICE.

HENRY SCHAUBEL, OF PHILADELPHIA, PENNSYLVANIA, ASSIGNOR OF ONE-HALF TO HENRY W. MILLER, JR., OF SAME PLACE.

BOILER-STAY.

SPECIFICATION forming part of Letters Patent No. 405,227, dated June 11, 1889.

Application filed January 24, 1889. Serial No. 297,376. (No model.)

*To all whom it may concern:*

Be it known that I, HENRY SCHAUBEL, a citizen of the United States, residing in the city and county of Philadelphia, State of Pennsylvania, have invented a new and useful Improvement in Stays for Boilers, which improvement is fully set forth in the following specification and accompanying drawings.

My invention consists of a boiler-stay formed of a tube which is tongued and shouldered, a tube-sheet which is engaged by the tongue and shoulders of the tube, and a bolt and nut, said parts being combined and operating as hereinafter set forth.

It also consists in grooving the head of the bolt and the nut, for purposes hereinafter explained.

Figure 1 represents a longitudinal section of a boiler-stay embodying my invention. Fig. 2 represents a longitudinal section of a modification thereof. Fig. 3 represents a section on line $x\,x$, Figs. 1 and 2.

Similar letters of reference indicate corresponding parts in the three figures.

Referring to the drawings, A designates the tube sheets or plates of a boiler, with which is connected the tube B. Passing through the tube is a bolt C, whose head D bears against one end of said tube and one plate, and whose point is threaded for the engagement of a nut E, which bears against the other end of the tube and contiguous plate. The tube A has each of its ends secured to the plates by shoulders F, swaged on said plates and embracing the opposite sides of the plates around the walls of the openings therein, thus clamping the same.

In Fig. 1 the walls of the openings in the sheets or plates are grooved and the metal of the tube is swaged thereinto, forming tongues which enter the grooves of the tube-sheet, thus providing additional means of connection of the tube with the plates and producing water-tight joints, the metal of the tube-sheet not being impaired or weakened by the swaged groove, but, on the contrary, being strengthened. The inner faces of the head of the bolt and nut are grooved to receive the end flanges or shoulders F, whereby said head and nut may be clamped tightly against the plates when so desired.

It will be seen that a reliable stay is provided, as the tube is connected with the plates, as has been stated, and, furthermore, braced, stiffened, and secured by the bolt and nut. If desired, the head of the bolt may be substituted by a nut.

Having thus described my invention, what I claim as new, and desire to secure by Letters Patent, is—

1. A boiler-stay consisting of a tube, tube-sheet, bolt, and nut, the tube having a tongue and shoulders on its periphery, and the walls of the openings of the sheet being grooved, said tongue entering the groove in the tube-sheet and said shoulders embracing opposite sides of the sheet, the parts named being combined substantially as described.

2. A boiler-stay consisting of a tube, bolt, and nut, substantially as described, the head of the bolt and the nut having grooves on their inner faces, as stated.

HENRY SCHAUBEL.

Witnesses:
HENRY W. MILLER, Jr.,
JOHN A. WIEDERSHEIM.